March 14, 1961 P. H. LOTT 2,975,038
METHOD OF AND APPARATUS FOR LIQUIFYING
GRANULAR MATERIALS
Filed April 15, 1958 7 Sheets-Sheet 1

INVENTOR
PETER H. LOTT
BY
*Robt H Cobb* ATTORNEYS.

March 14, 1961
P. H. LOTT
2,975,038
METHOD OF AND APPARATUS FOR LIQUIFYING GRANULAR MATERIALS
Filed April 15, 1958
7 Sheets-Sheet 3

INVENTOR
PETER H. LOTT
BY *Robb & Robb*
ATTORNEYS

March 14, 1961

P. H. LOTT 2,975,038

METHOD OF AND APPARATUS FOR LIQUIFYING GRANULAR MATERIALS

Filed April 15, 1958

INVENTOR
PETER H. LOTT
BY
ATTORNEYS

March 14, 1961

P. H. LOTT 2,975,038

METHOD OF AND APPARATUS FOR LIQUIFYING
GRANULAR MATERIALS

Filed April 15, 1958

INVENTOR
PETER H. LOTT
BY
ATTORNEYS.

March 14, 1961 P. H. LOTT 2,975,038
METHOD OF AND APPARATUS FOR LIQUIFYING
GRANULAR MATERIALS
Filed April 15, 1958 7 Sheets-Sheet 6

INVENTOR
PETER H. LOTT
BY Robert Cobb
ATTORNEYS.

United States Patent Office 2,975,038
Patented Mar. 14, 1961

2,975,038

METHOD OF AND APPARATUS FOR LIQUIFYING GRANULAR MATERIALS

Peter H. Lott, Salt Lake City, Utah, assignor to Utah-Idaho Sugar Company, Salt Lake City, Utah, a corporation of Utah Filed Apr. 15, 1958, Ser. No. 728,636

14 Claims. (Cl. 23—309)

The present invention relates to a method of and apparatus for liquifying dry granular materials, and more particularly to the liquifying of bulk granulated or pulverulent food materials, such as sugar, which are readily soluble and/or suspensible in a liquid solvent such as water.

In various industries, a need exists for an efficient, simple and inexpensive means for handling bulk granular materials in the nature of sugar. In many instances, the materials are to be used in a liquid form, and where this is so, a preference generally exists for liquid bulk handling over all other types of bulk handling systems. Because of the high freight costs accompanying the transporting of the liquid phase of liquified granular materials, such as liquid sugar, which may often comprise as much as one-half or more of solvent by weight, they have not become economically feasible to customers in all sections of the country. Even in the relatively close surrounding areas of the manufacturing plants or refineries where the materials have been made available in liquid form, additional charges have to be assessed to cover the cost of the liquification and the additional cost of freight attributed to the solvent content, and accordingly, economical delivery of the liquified product, which shall be referred to hereinafter as liquid-sugar, is practically limited to within a modest radius of the refinery.

Accordingly, it is a primary objective of this invention to provide a method of and apparatus for making available to all sections of the country liquified materials at dry bulk material prices. This can now be made feasible even for those installations using an economical minimum amount of granular material, by transporting the dry materials to the customers' plant and there, using water furnished by the customer along with applicant's novel apparatus and method, to efficiently convert the dry materials into a liquid form during the unloading operation.

Another object of the present invention is to provide a method of and apparatus for converting bulk sugar into liquid sugar which affords a great flexibility factor in the purchasing of bulk sugar in being able to utilize dry bulk sugar from any source and in any type of shipping container and being able to convert it into the liquid sugar in the buyer's own plant.

Still another object is to provide a method of and means for converting dry bulk sugar into liquid sugar in which the dry sugar is quickly introduced into an intimate mixture with the solvent, hereinafter to be referred to as water, while excluding entrainment of any substantial amounts of air, and thereby minimizing the possibility of contamination from air-borne materials and bacteria, as well as expediting the melting of the sugar granules.

A further object is to provide apparatus for liquifying sugar which utilizes an inexpensive yet very efficient self-contained "portable" mixer or liquifying unit which is readily carried by the dry bulk sugar transporting vehicle.

A still further object is to provide a self-contained mixer or sugar liquifying apparatus which is simple and inexpensive in construction and installation and yet efficiently operable as a permanent "in plant" unit installation.

Still another primary objective is to provide a method of and apparatus for converting dry bulk sugar into liquid sugar which assures substantially continuous liquifying of sugar, once set into operation, by means of a very efficient electrical liquid level control system which precludes flooding and pumping dry of the apparatus.

The foregoing objectives are attainable by providing a sugar-liquifying mixer or melter unit adaptable to both "portable" and "in-plant" installation, comprising a closed melter or surge tank adapted to receive dry bulk sugar in a manner that excludes the entrainment of any substantial amounts of air and having solvent inlet and outlet conduits associated therewith for directing substantially air-free sugar-solvent, hereinafter to be referred to as water, in a very fast jet-like fashion from a plurality of nozzles to intercept and mix with the sugar while in suspension as it enters the tank, said jets of water directing the solution against a curved baffle plate which further insures a more intimate mixture as it turns the solution through substantially 90° and into a spray form of reduced velocity before reaching the surface of the liquid within the mixing tank, and centrifugal pump means in combination with a fool-proof electrical circuit which assures a substantially continuous melting process while precluding flooding or pumping dry of the melter unit.

Among further objects and advantages of this invention are the attainment of a rapid melting rate of the sugar accomplished by rapid circulation, a mixing and melting of the sugar while in suspension, the ability to handle sugar of any grade and unhampered by lumps, a wide range of capacities permitting sugar to liquid ratios as high as 1 part sugar to 1.5 parts water, the use of relatively inexpensive standard centrifugal pumps, and an overall rapid and efficient unloading and liquifying of dry bulk sugar.

Other and further objects and advantages of this invention will become apparent to those skilled in the art from the following detailed description, and the novel features thereof will be defined in the appended claims.

Like reference characters designate corresponding parts throughout the several figures of the drawings, wherein 1 generally denotes the "portable" melter unit that is readily mountable and demountable preferably on the back end of a bulk sugar transporting vehicle generally denoted at 2. Upon transporting the bulk sugar to the customer's plant, the required amount of water to liquify the load of sugar is metered into one or more storage tanks 3, 3' by means of a water meter 4 and control valve 4'.

The portable melter unit 1, comprising a covered mixing or melting tank 5, the specific construction details of which will be described more completely hereinafter, includes water inlet and water outlet connections 6 and 7 respectively, said tank defining a closed chamber for the intimate mixing of the sugar and water solvent.

Sugar from the transport vehicle 2 may be fed into the tank 5 by any suitable means such as by a screw conveyor S running lengthwise along the bottom of the transport. The conveyor is preferably side-loaded throughout its entire length in a non-overloading manner, the details of which will be more fully described hereinafter.

A centrifugal discharge pump and motor assembly 8 is mounted in cooperative relationship with a lower and laterally offset portion of the tank 5 and is operatively connected with suitable liquid level control means 9 and 10. Together, they help provide for the necessary liquid flow control between the inlet and outlet, thereby assuring a proper mixture of the sugar and water, precluding flooding or pumping dry of the tank 5, as well as providing means for pumping the liquified sugar into the storage tank.

Leading from and back into the one or more storage tanks 3, 3' are liquid supply and return lines 11 and 12, respectively, which are provided with necessary gate valves and/or check valves therein, and which are adapted for operative connection with the respective inlet and outlet connections of the portable mixing tank 5 preferably by means of a pair of flexible quick-connect and disconnect hoses 13, 13.

Where the storage tanks are disposed in a manner as to assure sufficient head pressures to provide an adequate gravity water feed to the mixing tank 5 a solenoid operated solvent control valve 14 is preferably disposed in the water supply line 11 intermediate the storage tank 3 and mixing tank 5. Where sufficient head pressures are not available, a standard circulating pump and motor assembly 15, preferably a centrifugal pump of equal or slightly greater capacity than the centrifugal discharge pump assembly 8, is installed in supply line 11 for use in place of the solenoid valve 14, as indicated by the broken outline in Fig. 1.

The portable melter unit 1 is provided with its own electrical system circuitry as is diagrammatically shown on the rear of the transport vehicle 2. This circuitry, however, is preferably, but not necessarily, adapted to receive its operating power from the customer's electrical power source by means of a plug-in connector 16 which cooperates with a plant power outlet receptacle 17. A second plug-in connector 18, which cooperates with plant power outlet receptacle 19, gives operative connection between the solenoid valve 14 (or the pump 15, as the case may be) and the motor of the portable melter pump assembly 8 and its liquid level control. The "portable" circuitry generally comprises a start-stop switch 20, a melter pump starter 21, a liquid level control 9, 10, and a feed conveyor starter 23.

The main electrical circuitry of the plant is also diagrammatically illustrated in Fig. 1 (with a more complete schematic diagram appearing in Fig. 11) and is arranged to control a separate "in-plant" melter unit such as shown generally at 24, and the details and function of which will also be described in greater detail hereinafter. This "in-plant" melter unit circuitry generally comprises a main power supply fused disconnect switch 25, a start-stop switch 26, a "portable"-"in-plant" selector transfer switch 27, a cycle timer 28, an electrode assembly 22, a liquid level controller 29, a liquid level control transfer switch 30, a melter pump control 31 and an auxiliary circulating pump motor control 32 in the event an auxiliary circulating pump 15 is used.

When the required amount of water has been metered into the storage tanks 3 and 3', and the inlet and outlet connections, 6 and 7, respectively, of the "portable" mixer 5 have been connected with the supply and return lines 11 and 12, then the portable electrical system is plugged into the customer's in-plant electrical power system by means of the plugs 16 and 18. Gate valves 33, 33' and 34 are then opened and valves 35, 36, 37 and 38 are closed to ready the system for operation. The main safety disconnect switch 25 of the plant is closed and with the selector transfer switch 27 set at the number two position (the transport unloading position), the start-stop switch 20 of the portable unit is moved to the start position. This action causes the solenoid-operated solvent control valve 14 to open (or the circulating pump 15 to begin, as the case may be) thereby allowing the water to flow from storage tank 3 into the "portable" tank 5, while at the same time energizing the sugar feed conveyor S through its starter 23, whereupon the incoming sugar and the water which enters in spray-jet form are directed against a curved baffle and become intimately mixed within the tank 5, and upon reaching a predetermined level, the solution is pumped back into the storage tank 3. A proper operating balance between the amount of water and sugar entering the tank and the amount of liquid sugar leaving the tank is continuously maintained by the efficent liquid level control unit 9, 10 to be described in further detail hereinafter.

When all the bulk sugar has been liquified and transferred into the selected storage tank 3 and/or 3', the system may then be shut down by the opening of safety disconnect switch 25 and by uncoupling the portable plugs 16 and 18 and the flexible hoses 13, 13 after first closing valve 34 (the check valve 34' automatically checking the flow of water), and thereby permitting the transport vehicle to leave the plant.

Where circumstances permit, it is desirable and preferable to have an "in-plant" mixer unit, generally denoted at 24, installed so as to perimt greater flexibility for receiving and mixing bulk sugar right at the plant, regardless of the type or form of shipping container in which the bulk sugar arrives; and further to facilitate a recirculation of the liquid sugar between it and the storage tanks if so desired or needed after the transport vehicle has departed. The in-plant continuous mixing unit preferably comprises the same general elements as the portable unit in that it includes a closed mixing or melter tank 39 having sugar receiving means 40, solvent inlet-outlet means, 41 and 42 respectively, which are operatively connected with extensions 43 and 44 of solvent supply and return lines 11 and 12 respectively, a liquid level controller assembly including elements 22, 29 and 30, and a discharge pump and motor assembly 45 preferably of the centrifugal type.

Referring at this point more particularly to Figs. 2–5 inclusive, the specific details of one practical illustrative form of a portable sugar melter unit and associated feed conveyor will now be described. The portable melter unit comprises a melting or mixing tank 5 preferably of cylindrical form having bottom, top and sides. The lower portion of tank 5 is preferably laterally offset as at 46 and provides a preferably flat pump mounting surface 47 having an outlet orifice 48. Said orifice 48 in turn cooperates with the inlet or suction side of a vertically disposed centrifugal discharge pump and motor assembly 8 that encloses said orifice. The pump assembly 8 is secured to the tank 5 by any suitable means such as by a mounting bracket assembly 49 and bolts 50 (as best seen in Fig. 4) and has its discharge terminating in a quick-connect-and-disconnect outlet fitting 7. The top portion of the bank is provided with a closable opening 51 which serves as a means for permitting cleaning and sterilizing of the tank, as well as for inspection of the interior thereof. The opening 51 in this embodiment is of rectangular form and defined by a plurality of upstanding neck-forming members 52 and an extended upright portion 53 of a flattened rear side wall 54 of the tank 5. A correspondingly shaped cover plate 55, having a gasketed inner periphery to sealingly close the opening 51, is provided with a slotted hold-down arm 56 that cooperates with a threaded stud 57 fixed to the tank and a threaded hold-down nut 58.

Figure 4:
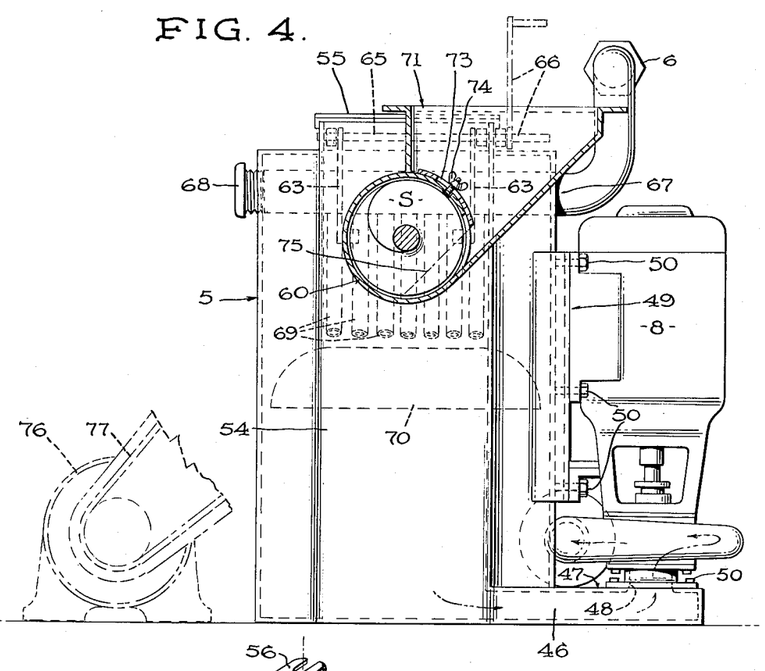
Fig. 4 is a cross-sectional view taken on line 4—4 of Figs. 2 and 3.
Figure 5:
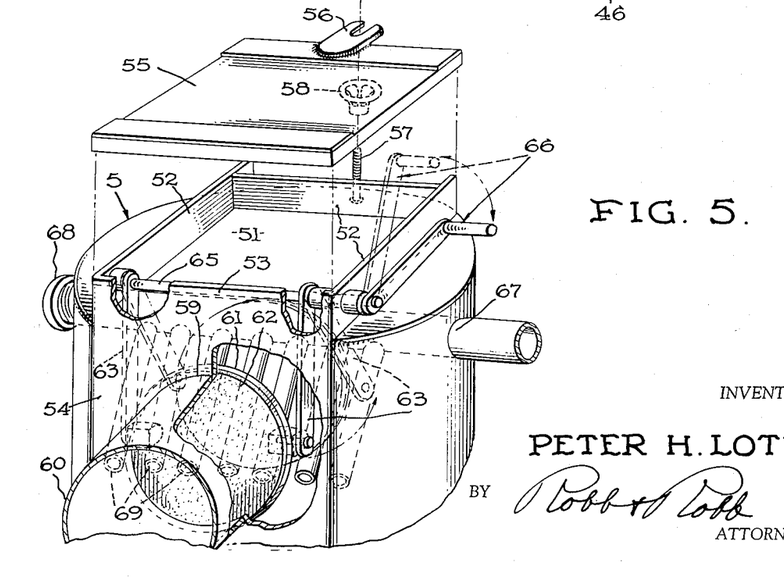
Fig. 5 is a fragmentary rear perspective view of the upper portion of the "portable" mixer unit, clarifying the vapor barrier and with the top cover raised to more clearly expose the structure thereof.

The flattened rear side wall 54 of the tank 5 is provided with preferably a circular sugar receiving opening 59 which cooperatively aligns with screw conveyor S of the transport vehicle 2 and its housing channel or tube 60 when said tank is operatively assembled or mounted upon the sugar transport vehicle 2. Said opening 59 is made closable by means of a preferably pivotally mounted circular closure door 61 having a gasketed sealing face 62, said door 61 serving as a vapor seal to block the flow of any vapor through the sugar inlet and conveyor tube 60 when the apparatus is not being used. The door 61 is carried between end portion of a pair of link arms 63 in pivotal fashion as at 64. The other ends of links 63 are fixedly carried by a crankshaft 65, said shaft being rotatably journalled in the two opposed neck-like members 52 adjacent to the extended flattened upright area 53 forming part of the tank top opening 51. A crank arm and handle assembly 66 is fixedly secured to one end of shaft 65 and is used to pivotally swing the sugar inlet door 61 from its closed position, shown in full lines (Figs. 2 and 5), to its open position shown in dash-dot lines (Figs. 3–5).

Figure 1:
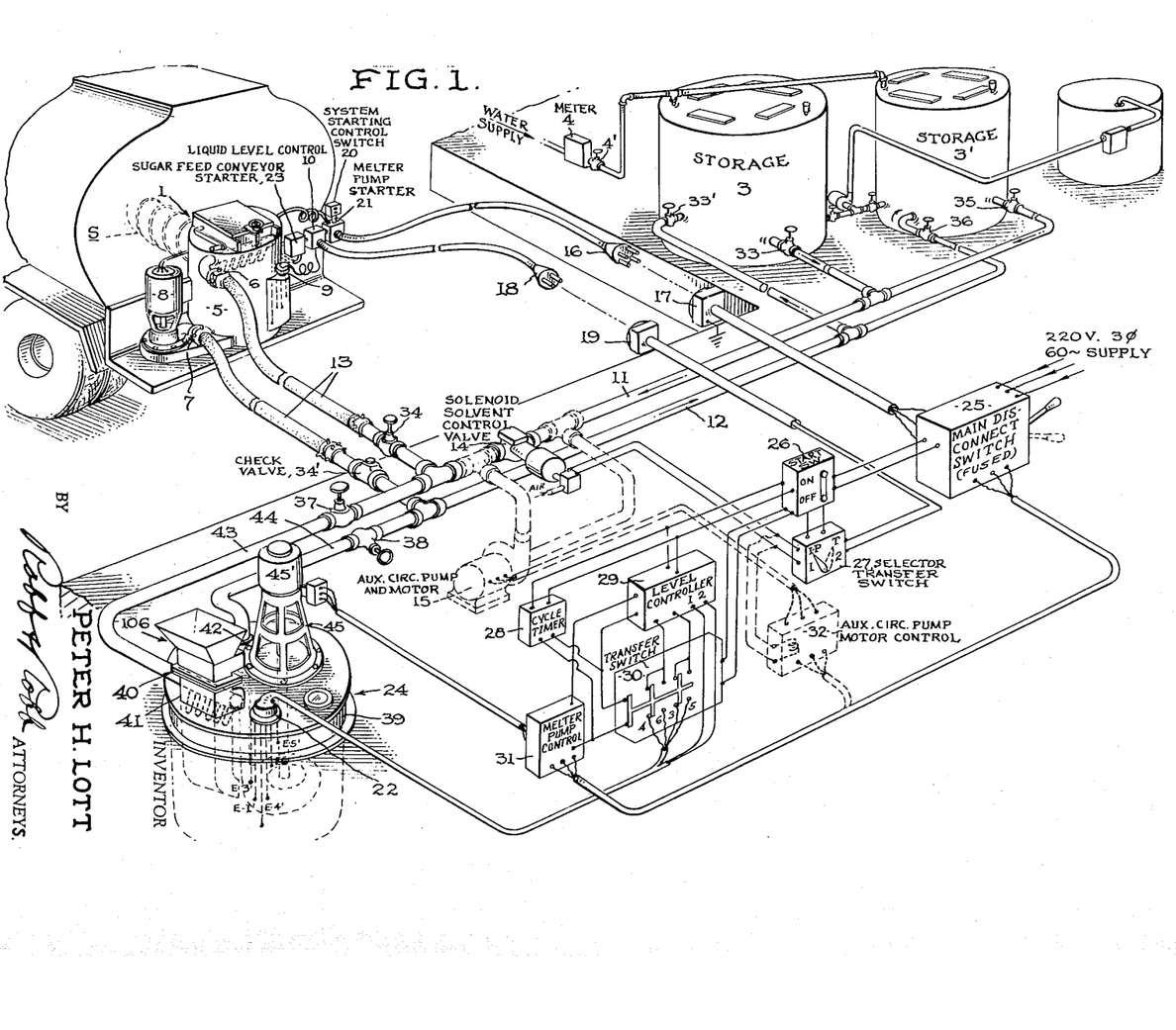
Fig. 1 is a combined general perspective and diagrammatic view representative of a dual method or system of and apparatus for liquifying bulk sugar which is adaptable for use with either a transport "portable" melter unit or an "in-plant" melter unit as illustrated.
Figure 2:
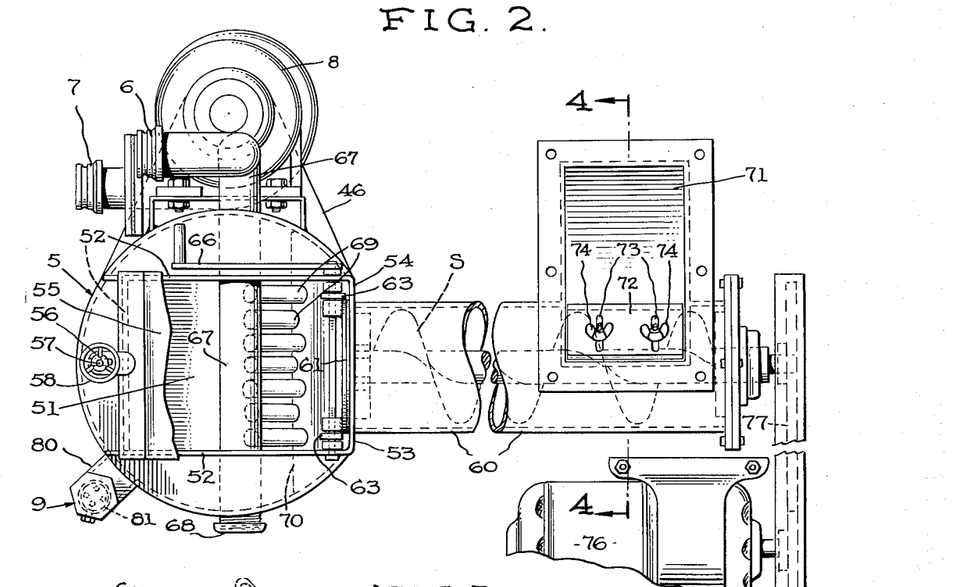
Fig. 2 is a top plan view illustrative of one practical form of the "portable" sugar melter or mixer unit with the top cover partially broken away.
Figure 3:
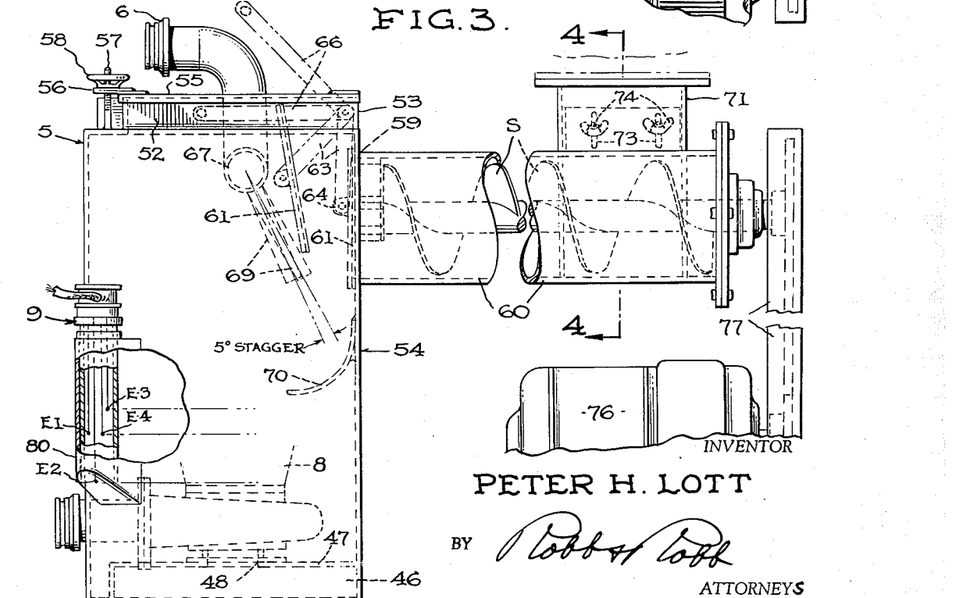
Fig. 3 is a side elevational view of the melter unit of Fig. 2.

Near the top portion of tank 5 and substantially diametrically across the same, a water inlet or supply header 67 is horizontally disposed with its terminating end capped off as at 68, while its other inlet end is provided with a suitable type of quick-connect-and-disconnect fitting 6 as best seen in Figs. 1–3. The inlet header 67 is provided with a plurality of preferably smaller diameter circular tubular jet nozzles 69 which are angularly disposed downwardly and rearwardly toward a curved baffle plate 70 which is secured to the flattened rear side wall 54 within tank 5 just below the sugar inlet 59. The nozzles 69 are preferably mounted on the header 67 in an alternately staggered relation to each other, for example a 5° stagger, as shown in Fig. 3, and act to increase the velocity of the water solvent and to more evenly distribute it across the full width of the sugar inlet 59. These nozzles 69, together with baffle 70, insure that an initimate mixture of incoming sugar and water is made even before the solution reaches the surface of the liquid within mixing tank 5.

Figures 8, 11, 12:
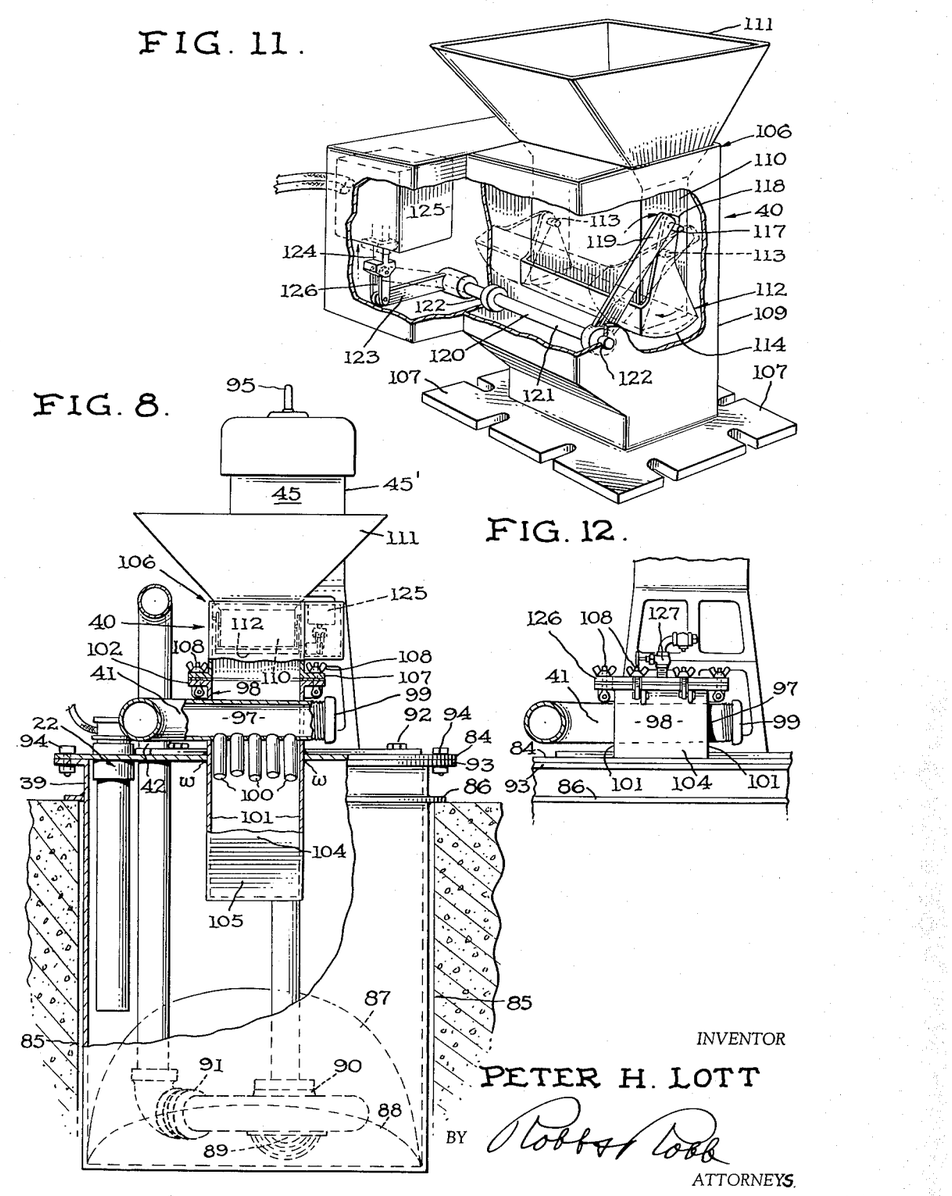
Fig. 8 is a side elevation view of the mixer unit of Figs. 6 and 7 and with a portion thereof also in cross-section for clarity of illustration.
Fig. 11 is a partially broken away perspective view of the removable hopper and cut-off gate assembly of the "in-plant" melter unit.
Fig. 12 is a fragmentary side elevational view showing a vented cover as substituted for the removable hopper and cut-off gate assembly of the "in-plant" melter unit.

In order to assure a uniform infeed of the sugar granules from the tank portion of the transport vehicle 2, the sugar conveyor S, which operates within a tubular channel as represented in Figs. 2–5 at 60 throughout the bottom length of the transport vehicle, is preferably fed from one side only in a non-overloading manner to be described hereinafter. While the conveyor S may feed along the full length of the transport vehicle 2, for the purpose of illustration (Figs. 2–4), a hopper 71 of limited size is shown disposed offcenter and above but in open communication with the conveyor channel or tube 60 to serve as a discharge conveyor forming part of a multiple worm conveyor system (not shown) such as is conventional in bulk sugar transport vehicles. The non-overloading feature of the conveyor S is achieved by the use of an adjustable plate 72 that is curved to conform to the surface of the channel 60. The plate 72 is made adjustable by means of a pair of parallel slots 73 therein and through which a pair of screw and wing nut assemblies 74, 74 are adjustably extended from holes in the channel 60. Therefore, it becomes apparent that plate 72 can be adjusted to set the desired high point from which the granulated sugar can enter the conveyor S, and from that point the angle of repose, indicated by the dotted line 75 (Fig. 4), for the granular material being handled, establishes the maximum loading on screw conveyor S. The conveyor S is driven by an electric motor 76 and drive belt assembly generally designated 77, the motor 76 being operably responsive to the electrical conveyor controller 23 as indicated in Figs. 1 and 11.

About midway up the tank 5 and outwardly offset on one side thereof is formed an integral pocket 80 which is completely open inwardly to the inside tank area and serves to house the electrode assembly 9 of the liquid level controller 10 (best seen in Figs. 2 and 3). The liquid level control means may be in the form of any of various commercially available liquid level controls, but preferably of the floatless electrode type such as manufactured by the Charles F. Warrick Company, and, as illustrated, comprises a protective sleeve 81 within which the required number of electrodes are suspended from above. In the case of this portable unit, a four electrode assembly is used wherein the four electrodes E1, E2, E3 and E4 are wired to the liquid level controller 10 mounted on the transport vehicle and as shown schematically in the upper half of Fig. 11. Electrode E1 is so positioned that when the liquid level in tank 5 reaches its predetermined level called the "pump on" level, electrode E1 and its relay R1 act to initially energize the discharge pump to begin pumping the liquid sugar back to the storage tank 3. If the amount of liquid sugar being pumped back to the tank 3 becomes greater than the combined amount of dry sugar and water entering the tank 5, then as the liquid level recedes to the predetermined "pump off" level at which E2 is positioned, the electrode E2 and the associated relay R1 act to stop the melter pump. If the amount of dry sugar and water coming into the tank 5 is more than is being pumped away from it, then the liquid sugar level rises until the predetermined "emergency" level, at which the electrode E3 is positioned, is reached, whereupon electrode E3 and the associated relay R2 act to stop the sugar conveyor S and the solenoid-operated supply valve 14 (or circulating supply pump assembly 15 as the case may be). This permits the level of the liquid to recede to the predetermined normal or "reset level" where electrode E4 is positioned and which is at the same level as E1, whereupon E4 resets the associated relay R2 and the conveyor S and solenoid valve 14 (or circulating pump 15) are once again started up. Thus, in this arrangement, the "input" to the melter is brought into substantial balance with the "output" from the melter, thus making the relative size of the water inlet and outlet lines of no particular consequence. However, where gravity feed or low head water supply pressure are used, it is preferable to make the inlet line of larger diameter than the discharge or outlet line.

In the event a centrifugal supply pump 15 is used, where sufficient head supply pressures are lacking, then its capacity and the capacity of the melter discharge pump should be about the same; but, to insure maximum capacity operation of the melter apparatus, the supply pump 15 preferably should have a slightly larger capacity than the melter discharge pump.

Referring now to the modified embodiment called the inplant melter unit, designated 24, as disclosed in greater detail by the illustrations of Figs. 6–12 inclusive, it operates generally in the same manner as the portable unit described hereinbefore, but differs in the specific construction and operational details of its various components as will now be described.

Figures 6, 7:
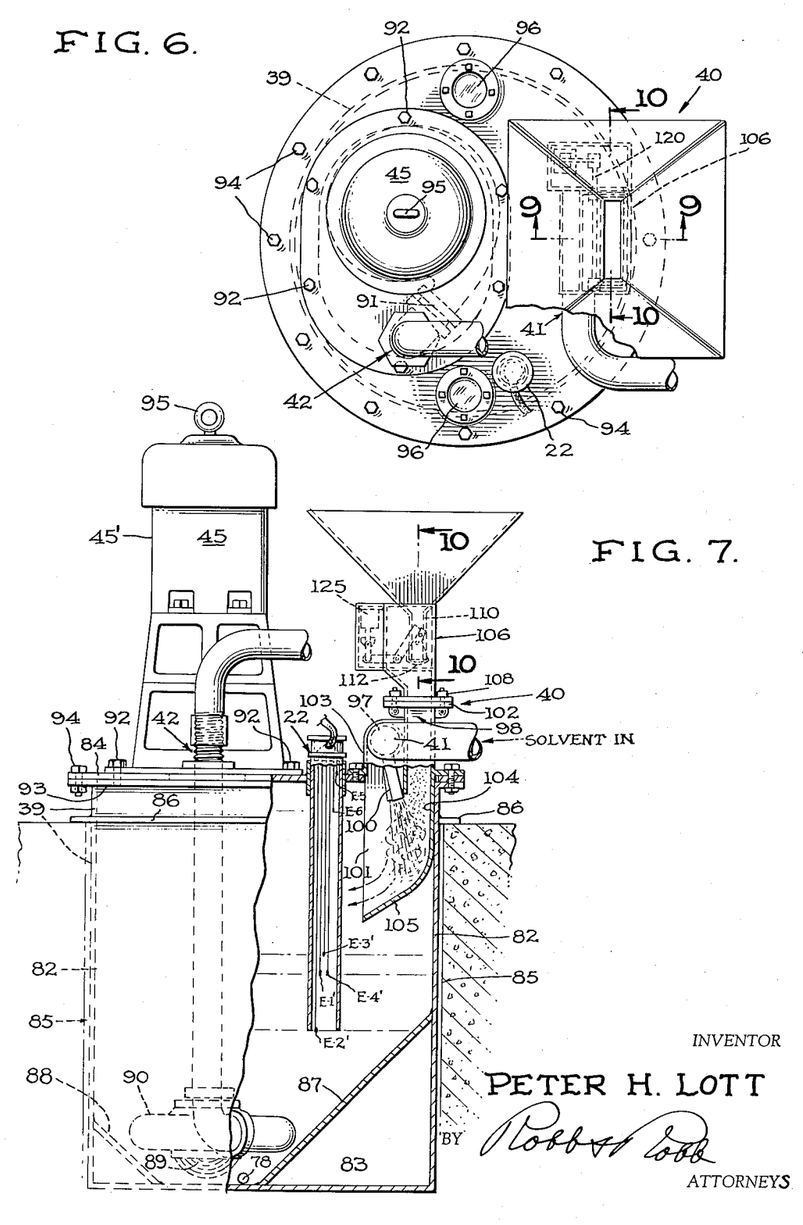
Fig. 6 is a top plan view illustrative of a modified embodiment of sugar mixer or melter unit which is more particularly adaptable to "in-plant" installation.
Fig. 7 is a side elevation view illustrative of the mixer unit of Fig. 6 and showing a portion of the unit in cross-section to better disclose the inner construction thereof.

The inplant mixing tank 39 is preferably of a generally cylindrical form having sides 82, bottom 83 and closed or closable top 84. The tank 39 is adapted to be set more or less permanently within a well 85 and may be supported therein by an annularly extended mounting flange 86 provided near the upper periphery of the tank. A suitable drain outlet means 78 is provided at a side edge of tank bottom 83 as shown in Fig. 7. The inside lower portion of the tank is preferably provided with a non-identical pair of chordal baffle plates 87 and 88 which are angularly and oppositely disposed with respect to the sides and bottom of the tank for the purpose of directing the liquid sugar solution into the more immediate intake area 89 of a discharge pump 90 forming part of the pump and motor assembly generally denoted 45. The pump 90 is preferably of the vertically mounted centrifugal sump type and has its outlet 91 operatively connected with the outlet means 42 passing through the top 84 of the tank 39. The pump drive motor 45' is securely mounted as by bolts 92 to the top 84 which is itself gasketed (not shown) and secured to an integral fastening flange 93 on the tank by means of bolt and nut assemblies 94. A lifting ring 95 is provided atop the pump and motor assembly 45 to facilitate the lifting on and off of the tank top 84 with its mounted assemblies to permit cleaning and sterilizing of the parts.

Also disposed in and on the tank top 84 are the water inlet means 41, the sugar inlet means 40, liquid level control electrode assembly 22 and a pair of sight or viewing ports 96, 96 (Fig. 6).

The water inlet means 41 includes a water supply header 97 which sealingly passes through a substantially rectangular duct work sub-assembly 98 forming part of the sugar inlet means 40, said header 97 terminating in a capped end 99. From that portion of the header 97 that is disposed within the duct work sub-assembly 98, depends a plurality of water inlet nozzles 100. The nozzles 100 are of smaller diameter than the header 97 to provide for an increase in the velocity of the incoming water in the form of jets and may be alternately staggered or angled with respect to each other in similar fashion as described hereinbefore with respect to the nozzles 69 of the portable mixer unit.

The sugar inlet ductwork sub-assembly 98 is secured to the top 84 in any suitable manner as by bolts or by welding as shown at W, and comprises two opposed side walls 101, 101 which extend both above and below the cover 84. Above the cover 84, the side walls 101, 101 terminate in an open bolting flange 102, together with the top portion of a front or inwardly disposed ductwall 103 (Fig. 7) enclosing the header 97 and which terminates at the surface of cover 84, and with the top portion of an opposed rear or outwardly disposed duct wall 104. The wall 104 is sufficiently spaced opposite from the wall 103 and header 97 to permit a free passage of the bulk sugar therebetween and extends downwardly through cover 84 terminating at a substantial distance therebelow in a curved chute or baffled lower end 105 (best seen in Fig. 7) against which the incoming mixture of sugar and jetted water is directed. The side walls 101, 101 are, of course, joined with the edges of rear wall 104 throughout their entirety, and the curved baffled lower end 105, together with the jet nozzles 100, insures that an intimate mixture of sugar and water is made even before the solution reaches the surface of liquid in the mixing tank 39. In addition, the use of the baffle helps to separate the smaller amounts of air that may enter the mixer, thereby allowing the water to more quickly surround and dissolve the sugar.

Figure 9:
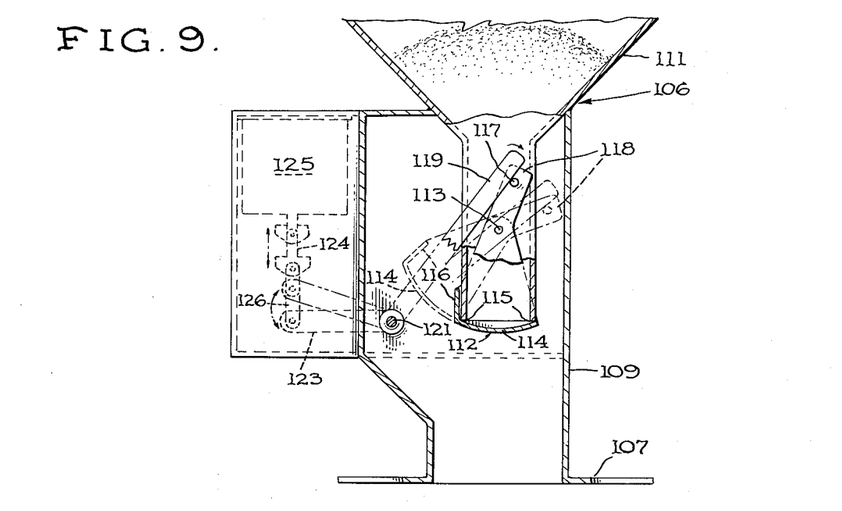
Fig. 9 is an enlarged cross-sectional detail view as taken substantially on line 9—9 laterally through the hopper and cut-off gate of Fig. 6.
Figure 10:
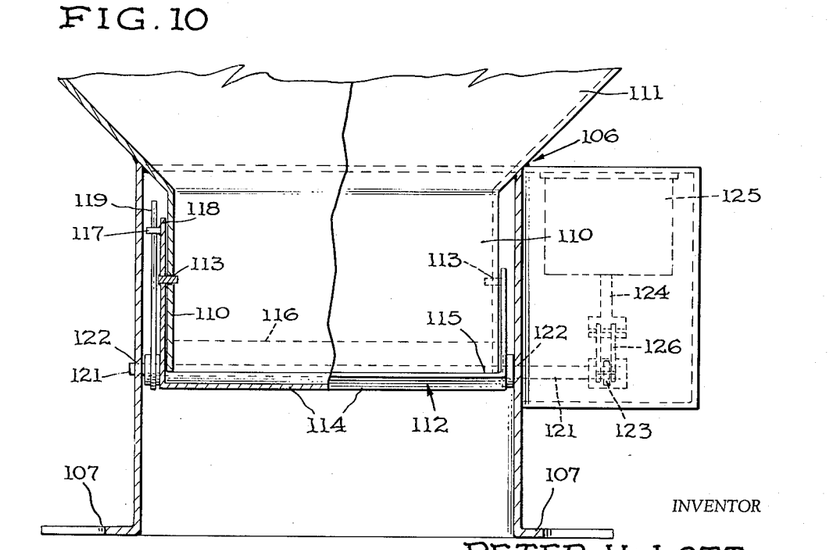
Fig. 10 is an enlarged longitudinal cross-sectional view of the hopper and cut-off gate, as seen substantially on line 10—10 of Figs. 6 and 7.
Figure 13:
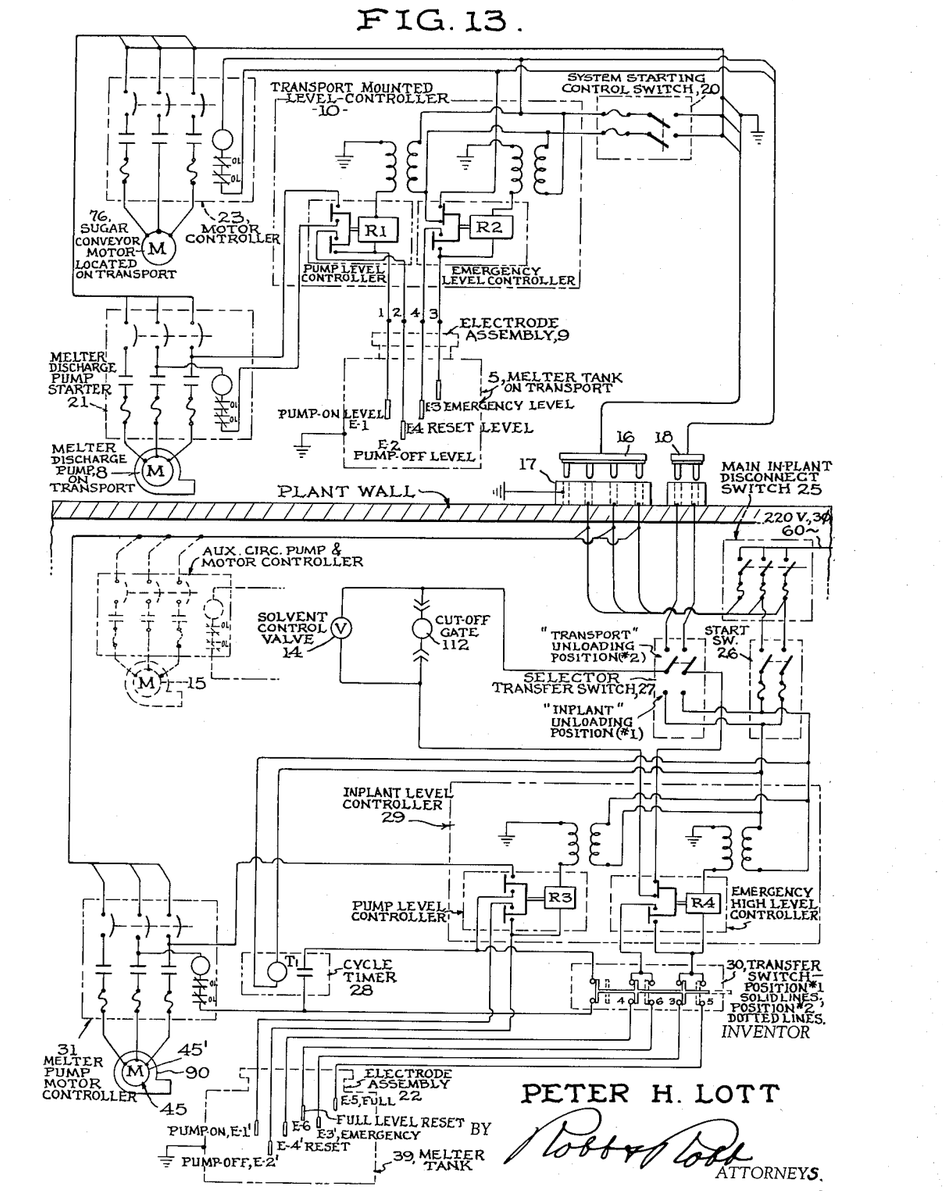
Fig. 13 is a diagrammatic wiring schematic illustrative of one form of an electrical system for both the "portable" and the "in-plant" sugar liquifying units.

The remainder of the sugar inlet means 40 comprises a feed hopper and solenoid operated cut-off gate and sub-assembly 106, best seen in Figs. 9, 10 and 11, which removably bolts to the flange 102 of sub-assembly 98, preferably by means of a mating flange 107 and pivotally mounted bolt and wing-nut assemblies 108. The sub-assembly 106 includes a vertically disposed generally rectangular duct work 109 having open ends, the lower end terminating in the above-mentioned flange 107 and the other open end being adapted to receive the depending feed neck portion 110 of a wide-mouthed supply hopper 111, said neck portion 110 being disposed therein in spaced relation to the four walls of ductwork 109.

Carried by the feed neck portion 110 of hopper 111 is a generally U-shaped sugar cut-off gate 112 having generally pie-shaped ends which are pivotally journaled in close proximity around the shorter dimensional ends of the neck 110 as shown at 113. The gate 112 has an arcuate concave lower blade 114 which is designed to sweepingly engage the longitudinal edges of the opening of the neck 110 as at 115, and said blade has an upwardly turned extension 116 at its inward side, which is fastened to the ends of the gate 112, to form a stop 116 which positively limits the closing swing of gate 112 as it engages that side of the neck 110. A pin 117, carried by an elongated ear 118 on one of the sides of gate 112, is engageable to pivotally swing open the gate by a rockable arm 119 which is one of a pair of rigid arms carried by a solenoid-actuated crank generally denoted 120. The crank 120 has a crank shaft 121 which is journaled in the shorter dimensional ends of ductwork 109 as at 122, 122, and which is disposed parallel with but sufficiently laterally of the gate 112 to afford a full and free swing of the cut-off gate 112 when operated. The free end of the other rigid crank arm 123 is operatively secured to the depending armature 124 of a solenoid 125 as by pivotal links 126, all of which is best seen in Figs. 10 and 11.

Thus it becomes apparent that when the solenoid 125 is energized, armature 124 is pulled upwardly, causing rotation of the crank arms, during which arm 119 engages pin 117 carried by the cut-off gate 112 to effect a pivotal opening swing of said gate, thereby permitting sugar from hopper 111 to drop through the opening of neck 110 and into intermixing contact with the jets of water issuing from the nozzles 100 on supply header 97. When the solenoid is de-energized, the gate 112 falls closed by gravity to cut off the sugar supply into the mixer tank 39.

The liquid level control electrode assembly 22, adapted to be disposed within the in-plant mixer 39, is preferably of the same floatless electrode type and very much analogous to the electrode assembly of level control means 9 of the "portable" mixer unit, described hereinbefore, and therefore need not be redescribed in complete detail. The number of electrodes within electrode assembly 22, however, is preferably six, of which the first four E1', E2', E3' and E4' are disposed and operate in the same relative manner as previously described for electrodes E1, E2, E3 and E4 of the portable mixer unit. The additional electrodes E5 and E6, disposed at predetermined levels indicated as "full" and "full level reset" respectively, in the schematic wiring diagram in the lower half of Fig. 11, are used after a particular melting operation has been completed and feed hopper sub-assembly 106 has been removed and replaced by a cover 126 having a vent valve 127 (Fig. 9), to allow a more complete filling of the mixer tank in order to effect any desired recirculation between it and the storage tank, and thereafter to maintain the mixer tank full of liquid sugar while out of service in order to prevent the development of bacteria in the otherwise void space above the normal level of liquid sugar, all of which will be more completely described hereinafter in a detailed explanation of the "in-plant" melter unit operation.

In the operation of the "in-plant" melter unit and its connected electrical system (Figs. 1 and 11), the required amount of water to achieve the desired concentration of liquid sugar for a given amount of bulk sugar to be melted or mixed is first metered into a storage tank 3 and/or 3' whose water supply and return lines, 11 and 12 respectively, the operatively connected with the inlet means 41 and the outlet means 42 of the mixing tank 39 by means of conduit extensions 43 and 44 respectively. With check valve 34' and gate valve 34 closing off their respective branches of the supply and return lines 11 and 12, and with gate valves 37 and 38 open, the selected storage tank valves 33, 33' or 35, 36, as the case may be, are opened to further ready the system. The main safety disconnect switch 25 is closed and with the selector transfer switch 27 set at the number one position (the "in-plant" unloading or mixing position), the start-stop switch 26 of the "in-plant" unit is moved to the "on" or "start" position. This action causes the electric solenoid-operated solvent control valve 14 to open (or the circulating pump 15 to begin, as the case may be), thereby allowing the water to flow from the storage tank into the mixing tank 39, while at the same time energizing the solenoid 125 to open cut-off gate 112. Opening of the cut-off gate permits bulk sugar, from any suitable source, to enter mixing tank 39 through hopper 111, whereupon it is intercepted by jets of water issuing from the nozzles 100 (Fig. 7). The two substances substantially completely mix together while in suspension and become more intimately mixed as they are directed against and then turned approximately 90° and away from baffle 105, whereupon the mixture collects with the liquid in the lower part of the tank in the form of a spray and at a somewhat reduced velocity.

When the liquid level in the tank 39 rises to the predetermined "pump-on" level at which electrode E1' is positioned, E1' and its relay R3 act to initially energize the melter discharge pump 90 to being pumping the solution back to the selected storage tank. If the amount of liquid sugar solution being pumped back to the storage tank becomes greater than the combined amount of the bulk sugar and water entering the mixing tank, then as the liquid level recedes to the pre-determined "pump-off" level at which electrode E2' is positioned, E2' and its relay R3 act to stop the melter pump until the normal operating level is again reached. If the amount of bulk sugar and water entering the mixer tank is more than is being pumped back to the storage tank, then the liquid sguar level rises the predetermined "emergency" level at which electrode E3' is positioned, whereupon E3' and its associated relay R4 act to close the solenoid-operated cut-off gate 112 and solvent control valve 14 (or circulating pump 15, as the case may be). This permits the liquid level to recede to the predetermined normal or "reset" level where electrode E4' is positioned and which is at the same level as E1', whereupon E4' and its relay R4 act to reset the liquid level controls so that once again the sugar cut-off gate and solvent control valve (or circulating pump 15) are reset for continuing operation. In this manner, the input to the melter tank is maintained in substantial balance with the output from the melter tank, thus making relative sizes of the water inlet and outlet lines of no particular consequence. Only where a gravity feed or a low head supply pressure is used is it preferable to use an inlet conduit of larger diameter and capacity than the outlet or discharge conduit; and, where a centrifugal supply or circulating pump, such as 15, is utilized, its capacity may be substantially the same as that of the discharge pump of the melter tank. However, to insure maximum operating capacity of the apparatus under said circumstances, it is preferable to use a circulating supply pump of slightly greater capacity than that of the discharge circulating pump.

When the "in-plant" melting operation of the given amount of bulk sugar has been completed, the feed hopper subassembly 106 is removed and replaced by the vented cover 126 (Fig. 12), and the level control transfer switch 30 is then moved from its solid line position number 1 to its dotted line position number 2 which transfers the liquid level controls from the "emergency" high level and "reset" level of electrodes E3' and and E4' over to the "full" and "full level reset" operated controls of electrodes E5 and E6 respectively. At the same time, this action affects the cycle timer 28 so that it commands control of the "in-plant" melter discharge pump and permits the liquid sugar solution to rise to the "full" level before electrode E5 acts to close the solvent control valve 14 (or the circulating supply pump 15, as the case may be).

As the cycle timer 28 closes its contact T1, the melter discharge pump starts pumping some of the liquid sugar back to the storage tank. When the liquid level recedes to the predetermined level of "full level reset" at which electrode E6 is positioned, the controls act to again open solvent control valve 14 (or circulating pump 15) and the liquid sugar then circulates between the melter tank and the storage tank for a predetermined length of time according to the pre-setting of the timer.

When the pre-set length of circulating time is attained and the timer 28 opens its contact T1, this causes only the melter tank discharge pump to stop, while permitting the inflow of liquid sugar through solvent control valve 14 to continue until the liquid rises to the "full" level before electrode E5 acts to close said solvent control valve 14. Thus, it becomes apparent that by this operation, the melter tank 39 is kept full of liquid sugar solution while it is not in operation in order to prevent dilution by condensation and the growth of harmful bacteria in what would otherwise be a void space above the liquid sugar.

The great flexibility and advantages afforded by use of either one or the other or both of applicant's novel "portable" and "in-plant" melter units as the particular circumstances may prescribe will be readily apparent from the foregoing. In addition to accomplishing the objectives and providing for the advantages as set out in the preamble of this application, the following further advantages are afforded. The customer can take advantage of considerably greater purchasing flexibility by being able to utilize dry bulk sugar from any source and in any type of shipping container, and thereafter less expensively and more efficiently being able to convert it into liquid sugar at or in his plant; the customer's initial equipment expense is minimized by its simple construction and use of standard centrifugal pumps which are considerably less expensibe in initial cost and maintenance and operational costs than equivalent pumps of a positive displacement type which some granular material mixing systems presently require; the "portable" mixing unit is quickly demountable, allowing for delivery of liquid sugar or dry bulk sugar, depending upon the instant circumstances; the more rapid melting afforded by substantial exclusion of air from the system for the reason that when the granules are surrounded by a substantial amount of air, it takes longer to displace the air with water and consequently longer to dissolve the sugar; a continuous sugar melting or mixing process is achieved while protecting the apparatus and system against plugging or clogging, flooding and pumping dry; the apparatus is of such a design that it provides no hidden surfaces where bacteria can grow; and by use of applicant's apparatus and system, the customer inherently improves the sanitation of his plant and his product to a large degree.

While the specific illustrative details have been herein shown and described, the invention is not confined thereto as various changes and alterations may be made without departing from the spirit and scope thereof as defined in the appended claims.

I claim:

1. The method of liquefying a dry soluble granular material, which comprises simultaneously introducing a granular material such as sugar and a liquid solvent such as water in substantially jet-spray form into the upper portion of a closed mixing chamber while substantially excluding the admission of extraneous elements including free atmospheric air from said mixing chamber during the admission and mixing of the granular material and solvent, directing said granular material in one flow path and the solvent in the form of a plurality of jet streams which are alternately staggered with respect to each other and to a common horizontal axis into a separate flow path which acutely intersects the flow path of the granular material while freely falling within the upper portion of the mixing chamber to attain a substantially intimately mixed solution thereof, intercepting the intermixed flow beyond the point of initial contact of the granular material and solvent so as to abruptly change the direction of and break up the flow into a spray of reduced velocity to assure a substantially complete dissolution of the granular material in the solvent, thereafter collecting said solution in the lower portion of said mixing chamber, and discharging said solution from the mixing chamber.

2. The method of liquefying a dry soluble granular bulk material, which comprises simultaneously introducing a granular material such as sugar and a liquid solvent such as water into the upper portion of a closed mixing chamber while substantially excluding the admission of extraneous elements including free atmospheric air from said mixing chamber during the admission and mixing of the granular material and solvent, directing said granular material and solvent along intersecting flow paths while freely falling within the upper portion of the mixing chamber to attain a substantially intimately mixed solution thereof, thereafter collecting said solution in the lower portion of said mixing chamber, discharging said solution from the mixing chamber into a separate storage tank, and recirculating the solution of liquefied material from the storage tank through the mixing chamber until a predetermined concentration of liquefied material is attained.

3. The method of liquefying a dry soluble granular bulk material which comprises simultaneously introducing a granular material such as sugar and a liquid solvent such as water into the upper portion of a closed mixing chamber while substantially excluding the admission of extraneous elements including free atmospheric air from said mixing chamber during the admission and mixing of the granular material and solvent, directing said granular material and solvent along intersecting flow paths while free falling within the upper portion of the mixing chamber to attain a substantially intimately mixed solution thereof, thereafter collecting said solution in the lower portion of said mixing chamber, discharging said solution from the mixing chamber into a separate storage tank, subsequently completely filling said mixing chamber with liquefied material after a predetermined concentration thereof is attained to prevent condensation and minimize bacteria growth therein when not in active use, and periodically circulating the admixture between the storage tank and the mixing chamber to further minimize condensation and bacteria growth.

4. A system for liquefying dry bulk granular materials, comprising a supply of liquid solvent and a supply of granular material, a closed receptacle defining therein a mixing chamber having separate inlet means for the granular material and the solvent respectively at the upper portion of the mixing chamber and separately communicating with said respective supplies, discharge outlet means at the lower portion of said chamber, means for producing a gravity flow of the granular material into the mixing chamber while substantially excluding extraneous elements including free atmospheric air from the mixing chamber, means for simultaneously directing a jet spray flow of solvent into intermixing contact with the granular material in the mixing chamber while also substantially excluding extraneous elements including free atmospheric air from the mixing chamber, means for dividing the solvent flow into an elongated series of jet streams of increased velocity which are alternately staggered with respect to each other and to a common horizontal axis and for directing the same to acutely intercept and substantially dissolve the incoming flow of granular material while in free falling gravitational suspension and while continuing to exclude said extraneous elements during the admission and dissolution of said granular material and solvent, and discharge pump means connected with the chamber outlet means to effect discharge of the liquefied granular material from the mixing chamber.

5. A system for liquefying dry bulk granular materials, comprising a supply of liquid solvent and a supply of granular material, a closed receptacle defining therein a mixing chamber having separate inlet means for the granular material and the solvent respectively at the upper portion of the mixing chamber and separately communicating with said respective supplies, discharge outlet means at the lower portion of said chamber, means for producing a gravity flow of the granular material into the mixing chamber while substantially excluding extraneous elements including free atmospheric air from the mixing chamber, means for simultaneously directing a jet spray flow of solvent into inter-mixing contact with the granular material in the mixing chamber while also substantially excluding extraneous elements including free atmospheric air from the mixing chamber, means for dividing the solvent flow into an elongated series of jet streams of increased velocity which are alternately staggered with respect to each other and to a common horizontal axis and for directing the same to acutely intercept and substantially dissolve the incoming flow of granular material while in free falling gravitational suspension and while continuing to exclude said extraneous elements during the admission and dissolution of said granular material and solvent, progressively curved baffle means disposed within the upper portion of the mixing chamber below the granular material and solvent inlet means and against which the admixture of granular material and solvent is directed for abruptly changing the direction of the flow path of said admixture to assure a substantially complete dissolution of the granular material in the solvent before collection in the lower portion of the chamber, and discharge pump means connected with the chamber outlet means to effect discharging of the liquefied granular material from the mixing chamber.

6. A system for liquefying dry bulk granular materials comprising an enclosed storage tank adapted to contain a predetermined amount of liquid solvent, a closed receptacle defining therein a liquefying chamber having solvent inlet and outlet means respectively communicating with the storage tank and with the supply of liquid solvent, means for producing and regulating a gravity feed input flow of granular material into the liquefying chamber while substantially excluding extraneous elements including free atmospheric air from said chamber, separate means for simultaneously producing and regulating an input flow of liquid solvent in jet spray form into acutely intersecting and intermixing contact with the granular material within the upper portion of said chamber while freely falling and while also excluding extraneous elements including free atmospheric air from said chamber during the admission and intermixing of the granular material and solvent, said last-mentioned means including an axially extended solvent header conduit disposed substantially horizontally within the upper part of the liquefying chamber and having a plurality of spaced laterally extended jet nozzles of reduced cross-sectional area angularly depending therefrom and alternately staggered with respect to each other and to a common horizontal axis, discharge pump means disposed adjacent the lower portion of and interconnecting the outlet of said chamber with the storage tank and operable to control the discharge of said liquefied material from said chamber back into said storage tank, means for controlling the liquid level within said chamber, said latter means including immersible electrode control instrumentalities disposed in said tank and operable responsive to predetermined levels of the liquid and separately connected to the respective granular material and solvent input flow regulating means and with the discharge pump means for maintaining a predetermined liquid level in the liquefying chamber.

7. A system as defined in claim 6, wherein baffle means are disposed within the upper portion of said liquefying chamber and against which the admixture of granular material and solvent is directed after their initial contact with each other for abruptly changing the direction of the flow path of said admixture to assure substantially complete dissolution of the granular material in the solvent before collection in the lower portion of the chamber.

8. A system as defined in claim 6, wherein the receptacle defining the liquefying chamber is mobile and is provided with means for separably interconnecting the same in operative relation to the other elements of the system.

9. A system for liquefying dry bulk granular materials as defined in claim 6, wherein the control means further include control instrumentalities connected to the discharge pump means and to the solvent inlet regulating means to recirculate the liquefied material between the storage tank and the liquefying chamber until a predetermined concentration of liquefied material is attained, and further control means for thereafter completely filling said chamber with the liquefied solution to minimize condensation and bacteria growth within said chamber when not in active use.

10. A system for liquefying dry bulk granular materials as defined in claim 6, wherein the control means further include timer control instrumentalities connected to the discharge pump means and to the solvent inlet regulating means to periodically recycle the liquefied solution between the storage tank and the liquefying chamber, and to thereafter completely fill the mixing chamber with the liquefied solution to prevent growth of bacteria therein when not in active use.

11. A mixing unit for use in liquefying soluble granular materials, comprising a closed tank having means adjacent its upper end for producing a free-falling gravity flow of granular material into the tank, separate means disposed horizontally adjacent the upper portion of the tank for producing and directing a flow of liquid solvent into intermixing contact with the granular material while freely falling, said latter means comprising a laterally elongated header conduit having a plurality of spaced angularly depending jet nozzles, said nozzles having their free ends alternately staggered with respect to each other and to the horizontal axis of the header conduit, and said tank having a discharge outlet.

12. A mixing unit as defined in claim 11, wherein said tank is provided with a baffle member within the tank which progressively curves from one side across the path of the incoming solvent and granular material and against which the admixture of solvent and granular material is directed and then abruptly deflected to assure a substantially complete dissolution of the granular material.

13. A mixing unit as defined in claim 11, wherein the tank is provided with a submersible discharge pump in the lower portion thereof, said pump being connected with the tank discharge outlet, and said tank being provided with baffle means in the lower portion thereof for directing the liquefied material to the discharge pump.

14. A mixing unit as defined in claim 11, wherein the means for admitting the granular material includes an intake hopper assembly removably mounted on the upper end of said tank, and said hopper assembly including a pivotally mounted cut-off gate for controlling the admission of the granular material into the tank.

References Cited in the file of this patent

UNITED STATES PATENTS

| | | |
|---|---|---|
| 1,681,490 | Lomax | Aug. 21, 1928 |
| 1,903,957 | Clark | Apr. 18, 1933 |
| 1,934,716 | Jewitt | Nov. 14, 1933 |
| 2,007,799 | Gloersen | July 9, 1935 |
| 2,206,237 | Roberts | July 2, 1940 |
| 2,573,949 | Blizzard | Nov. 6, 1951 |
| 2,760,820 | Cirese | Aug. 28, 1956 |
| 2,796,365 | Thurlings | June 18, 1957 |